(12) United States Patent
Büttner et al.

(10) Patent No.: US 9,588,930 B2
(45) Date of Patent: Mar. 7, 2017

(54) METHOD FOR THE DATA EXCHANGE BETWEEN A TERMINAL AND A CHIP CARD

(75) Inventors: Bernhard Büttner, Germering (DE); Robert Griesmeier, OT Heufeldmühle (DE); Karl Eglof Hartel, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 719 days.

(21) Appl. No.: 14/116,690

(22) PCT Filed: May 8, 2012

(86) PCT No.: PCT/EP2012/001977
§ 371 (c)(1),
(2), (4) Date: Nov. 18, 2013

(87) PCT Pub. No.: WO2012/152431
PCT Pub. Date: Nov. 15, 2012

(65) Prior Publication Data
US 2014/0082247 A1    Mar. 20, 2014

(30) Foreign Application Priority Data

May 11, 2011 (DE) .......... 10 2011 101 297
Aug. 31, 2011 (DE) .......... 10 2011 112 031

(51) Int. Cl.
*G06F 13/40* (2006.01)
*G06K 7/00* (2006.01)
(Continued)

(52) U.S. Cl.
CPC ....... *G06F 13/4081* (2013.01); *G06K 7/0008* (2013.01); *G06K 19/07* (2013.01);
(Continued)

(58) Field of Classification Search
CPC .. G06F 13/4081; G06K 7/0008; G06K 19/07; G06K 19/07733; G06Q 20/341; G07F 7/0893

See application file for complete search history.

(56) References Cited

U.S. PATENT DOCUMENTS 6,151,647 A * 11/2000 Sarat .................... G06K 7/0008
                                                                710/104
6,199,128 B1 * 3/2001 Sarat .................... G06K 7/0008
                                                                710/2
(Continued)

FOREIGN PATENT DOCUMENTS

DE        19523275 C1    12/1996
DE        10344049 A1    6/2004
(Continued)

OTHER PUBLICATIONS

International Search Report for corresponding PCT Application No. PCT/EP2012/001977, mailed Jul. 24, 2012.

*Primary Examiner* — Nimesh G Patel
(74) *Attorney, Agent, or Firm* — Workman Nydegger

(57) ABSTRACT

A method includes exchanging data between a chip card and a terminal in a contact-based manner via a contact field. The method comprises the steps of: activating a first contact assignment in response to a first communication protocol present on the contact field and occupying a first part of contact surfaces of the contact field; recognizing a change of the communication protocol from a first communication protocol to a second communication protocol with a protocol recognition unit in the chip card; and activating a second contact assignment in response to the recognized second communication protocol occupying a second part of contact surfaces of the contact field. The first and the second part of contact surfaces of the contact field are selected from an ISO-7816-2 contact field having a maximum of six contact surfaces and the second communication protocol requires at least two data lines.

15 Claims, 5 Drawing Sheets

(51) Int. Cl.
*G06K 19/07* (2006.01)
*G06K 19/077* (2006.01)
*G06Q 20/34* (2012.01)
*G07F 7/08* (2006.01)

(52) U.S. Cl.
CPC ..... *G06K 19/07733* (2013.01); *G06Q 20/341* (2013.01); *G07F 7/0893* (2013.01)

(56) References Cited

U.S. PATENT DOCUMENTS

| | | |
|---|---|---|
| 8,272,573 B2 | 9/2012 | Hartel |
| 2003/0085287 A1 | 5/2003 | Gray |
| 2005/0029360 A1 | 2/2005 | Rhelimi |
| 2005/0097237 A1 | 5/2005 | Ruping et al. |
| 2007/0194134 A1* | 8/2007 | Shin ................ G06K 19/07733 235/492 |
| 2009/0043918 A1* | 2/2009 | Schroeder ............. G06K 19/07 710/11 |
| 2009/0327529 A1* | 12/2009 | Mardiks ................ G06K 19/07 710/11 |
| 2010/0090805 A1* | 4/2010 | Llbotte ............. G06K 19/0719 340/10.2 |
| 2010/0108772 A1* | 5/2010 | Hartel .................... G06K 19/07 235/492 |

FOREIGN PATENT DOCUMENTS

| | | |
|---|---|---|
| DE | 10344852 A1 | 5/2005 |
| WO | 2008058743 A1 | 5/2008 |

* cited by examiner

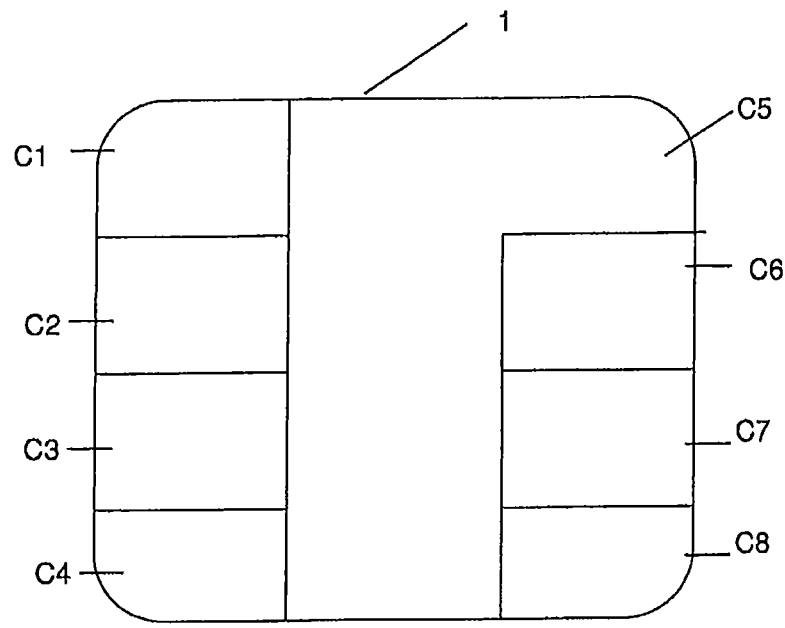
Fig 1 – Prior art
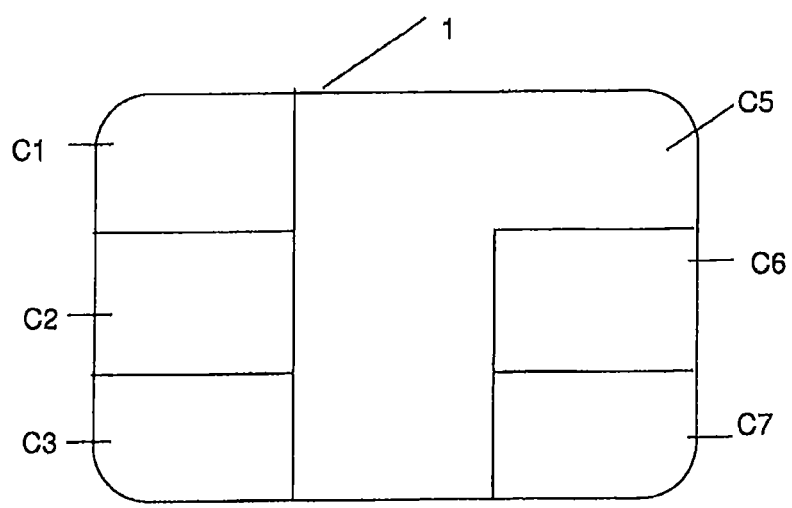
Fig 2 – Prior art

METHOD FOR THE DATA EXCHANGE BETWEEN A TERMINAL AND A CHIP CARD

BACKGROUND

The invention relates to a method as well as to a chip card for the exchange of data between a chip card and an end device.

SUMMARY

A chip card is a portable data carrier having corresponding security functionality. Within the chip card there is arranged at least one semiconductor chip with a central processing unit CPU and a memory region with different memory technologies, in particular volatile and non-volatile memory regions. On the semiconductor chip there are stored machine-readable data, for example a person's identification data, secrets such as passwords or access codes, private parts of signature keys etc.

Nowadays, diverse chip cards are employed which a user can carry in order to utilize different services or carry out transactions. For example, mobile radio cards are used as chip cards to obtain, by corresponding authentication, an access to secure regions or services, e.g. the applications of a mobile radio provider that are made available over a mobile radio network. Depending on the type, and manner of use, of such a data carrier, the exchange of data between the data carrier and an end device in contact therewith, for example a mobile telecommunication end device or bank terminal, is carried out via a suitable communication protocol.

An exchange of data is understood here to be a signal transmission, a mutual control and in simple cases also a connection from/between the technical end device and the chip card. In information theory, a data exchange is marked, inter alia, by the sender-receiver model: Data or information are coded into characters and then transmitted from a sender via a transmission channel to a receiver. Here it is crucial that sender and receiver employ the same coding, so that the receiver understands the message, i.e. can decode the data to be exchanged.

The chip card is connected with the end device here via the physical interface of a contact pad of the data carrier. For each employed communication protocol there is agreed an individual contact assignment of the contact pad whose contacts are not simultaneously available for other purposes, e.g. for a further communication protocol.

The number of contact points of such a contact pad and thus the possible different contact assignments is strongly limited. Via a contact pad employed in the chip card region according to the ISO 7816-2 standard with eight contact points C1 to C8, as represented in FIG. 1, different communication protocols are used for a contact-type communication (referred to hereinafter as "contact-type communication protocols"), for example the MMC high-speed protocol ("multimedia card"), which uses the contacts C4, C6 and C8, or the USB high-speed protocol ("universal serial bus"), which uses the contacts C4 and C8 (cf. documents SCPt060551 and SCPt060552 of the European Telecommunications Standards Institute, ETSI).

Furthermore, in particular from WO 2008/058743 A1 there is also known a support for communication protocols for a contactless communication (referred hereinafter as "contactless communication protocols"), for example the Single Wire Protocol, SWP for short, to whose entire disclosure reference is clearly made. In this disclosure it is described how a technically possible contactless communication can be carried out despite at least some contacts of the associated contact assignment being blocked by an already activated contact-type communication. For the implementation of this solution, however, an ISO-7816-2 contact pad having at least 8 contact pads is necessary.

Due to the increasing miniaturization of end devices, in particular in the mobile radio sector, it is desirable to reduce also the subscriber identification cards, SIM cards for short, in size. In order to maintain the downward compatibility, the barrier to the miniaturization is the contact area pad to be employed. It is therefore conceivable that for future form factor standards for chip cards, in particular SIM cards, no contact pad having eight contact areas will be used and the contact pad having only 6 contact areas, described in the ISO-7816-2, will be used.

In DE 103 44 852 A1 it is generally described that a contact pad having six contact areas could be employed to employ, besides an ISO protocol, a USB communication protocol for the data exchange.

The invention is based on the object of configuring a data exchange between a chip card and an end device to be flexible, wherein the overall area of the ISO standard contact pad having six contact areas is not to be exceeded. It is in particular the object of this invention that a plurality of different contact-type and/or contactless communication protocols, which in turn require different contact area assignments, can be employed for the data exchange via a contact pad of the ISO standard size for six contact areas. It is furthermore the object to enable a quasi-parallel communication between a high-speed protocol with two data lines, in particular USB or Fire Wire, and a further contact-type or contactless communication protocol.

The object of the invention is achieved by the measures described in the equal-ranking independent claims. Advantageous embodiments are described in the respective dependent claims.

The object is achieved in particular by a method for the exchange of data between an end device and a chip card, the data exchange between end device and chip card being effected in contact-type manner via a contact pad having a maximum of six contact areas according to the ISO-7816-2 standard. The method according to the invention comprises the steps of: activating a first contact assignment in reaction to a first communication protocol present at the contact pad, the first communication protocol being assigned to a first combination of the six contact areas of the contact pad; recognizing a change of the communication protocol from a first communication protocol to a second communication protocol by a protocol recognition unit within the chip card; and activating a second contact assignment in reaction to the recognized second communication protocol, the second communication protocol being assigned to a second combination of the six contact areas of the contact pad. The method is characterized in that the first communication protocol is in particular a contactless communication protocol different from the ISO-7816 standard; and the second communication protocol is a communication protocol with two data lines.

Alternatively, the object is achieved by a method for exchanging data between an end device and a chip card, the data exchange between end device and chip card being effected in a contact-type manner via a contact pad having a maximum of six contact areas according to the ISO-7816-2 standard, having the method steps of: activating a third contact assignment in reaction to a third communication protocol present at the contact pad, the third communication protocol being a communication protocol according to the ISO-7816 standard and being assigned to a third combination of the six contact areas of the contact pad; recognizing a change of the communication protocol from the third communication protocol to a second communication protocol or a first communication protocol by a protocol recognition unit within the chip card; and activating a second contact assignment in reaction to the recognized second communication protocol, the second communication protocol being assigned to a fourth combination of the six contact areas of the contact pad. The method is characterized in that the second communication protocol is a communication protocol with two data lines; and the first communication protocol is in particular a contactless communication protocol different from the ISO-7816 standard and a data line of the first communication protocol is neither employed in the third combination nor in the fourth combination of the six contact areas of the contact pad.

In particular, the second protocol is a high-speed protocol, in particular USB or FireWire.

In particular, the first communication protocol is the Single Wire, the Bluetooth, the WiFi or an RFID protocol, so that communication with the chip card can be effected by means of contactless communication protocols, it being possible to change into a high-speed communication protocol as needed. The term contactless communication protocol is interpreted here such that at least a part of the transmission path for the data exchange is effected in contactless fashion, for example via a near field communication interface. The term contactless communication protocol here does not exclude that a part of the data exchange is effected in contact-type manner, in particular the conversion of the energy signals from the air into line-conducted signals for applying to the contact pad.

The object is further achieved by a chip card that comprises a contact pad according to the ISO 7816-2 standard, at least two interface units for the data exchange with an end device according to a corresponding communication protocol via a corresponding contact assignment of the contact pad and a protocol adjustment unit. Here, the at least two interface units have at least one contact interface unit for the communication according to a first contact-type communication protocol or according to a second contact-type communication protocol and a contactless interface unit for the communication according to a contactless communication protocol via a preset contact assignment of the contact pad. The protocol adjustment unit here comprises a protocol recognition unit, the protocol recognition unit being adapted to activate, simultaneously with a first interface unit already activated in reaction to a communication protocol present at the contact pad, a second interface unit in reaction to a second communication protocol present at the contact pad. The contact pad here is an ISO-7816-2 contact pad having a maximum of six contact areas and the second contact-type communication protocol comprises at least two data lines.

A protocol adjustment unit of the data carrier is here able to enable communication via at least two different communication protocols regardless of whether contactless or contact-type.

The term "contact assignment of a communication protocol" is to be understood here to be that individual group of contacts of the contact pad that is accessed by an end device upon communication with the data carrier via the communication protocol. "Activation of a contact assignment" is thus understood to be an activation of that interface unit of the data carrier that accesses contacts of the contact pad that constitute the contact assignment belonging to the communication protocol supported by the interface unit.

The change of the communication protocol is indicated to the chip card by the end device. The chip card recognizes the indicated change advantageously by the monitoring of a signal level on a contact area of the contact pad having only six contact areas, which contact area is not employed for the activated first or second communication protocol. A protocol recognition unit thus monitors the logical signal level of the non-employed contact area and recognizes a signal level change initiated by the end device.

In a further embodiment, the chip card is able to change into a third communication protocol, thereby being assigned a third combination of the six contact areas of the contact pad on account of the activated third communication protocol.

According to the shown solution, there is thus created a chip card for the data exchange with an end device, which chip card can very flexibly change between the great variety of contact-type and contactless and contact-type high-speed protocols. A change from a previously activated protocol or a protocol not yet activated in the session is possible at any time by a corresponding indication on the end device side.

In an alternative embodiment, the chip card recognizes the indication on the end device side by evaluating a determined data packet within the respectively activated first or second communication protocol. If a communication protocol with two data lines is active, in particular a signal burst on one of the data lines, which is generated on the end device side, can indicate that a change of the communication protocol is desired on the end device side, so that an alternative contact assignment and evaluation of the data must be adjusted on the contact pad.

Alternatively, the end device of the chip card indicates the protocol change by the voltage supply at one of the contact areas being varied. A variation is possible in the amount of the voltage level, a modulation of the voltage, for example ASK, FSK etc.

Alternatively, the end device of the chip card indicates the protocol change by a signal level alteration, which according to the currently activated communication protocol represents a violation of the level, is thus either outside permissible tolerances of the amount or includes data words that are not allowed in this communication standard.

Alternatively, the alteration of the clock frequency at a contact area is the recognition feature for the chip card to change the communication protocol.

The method according to the invention is to be employed preferably with subscriber identification cards during a data exchange with a mobile communication end device as an end device for operation in a mobile communication network, because especially with the communication end devices, for example mobile phones, PDA, smartphones, handhelds etc, a reduced-size variant of the chip card is to be expected in order to obtain more space for additional functionality within the communication end device.

The second communication protocol is in particular the universal serial bus protocol. This protocol requires, besides the voltage supply +5V at contact area C1 and ground at contact area C5, two data lines D+ and D− that hitherto were controlled via the contact areas C4 and C8 of the ISO standard contact pad.

In the method according to the invention, the USB communication protocol is now driven via the contact pad having only six contact areas, by the voltage supply and the ground supply, as hitherto, being driven via the contact areas C1 and C5, whereas the two data lines D+ and D− are to be tapped via the contact areas C6 and C7. This implies that a simultaneous data exchange between chip card and end device via the ISO standard protocol with C7 as I/O data line is no longer possible. A change of the communication protocol from USB into ISO or SWP is now either indicated by the end device via the clock line C3 and recognized by the chip card, or recognized by means of a USB data packet in the protocol adjustment unit.

Alternatively, in the method according to the invention, the USB communication protocol is now driven via the contact pad having only six contact areas, by the voltage supply and the ground supply, as hitherto, being driven via the contact areas C1 and C5, whereas the two data lines D+ and D− are to be tapped via respectively one of the three contact areas C2, C3, C7. Thus, the recognition of the first protocol, in particular of a contactless communication protocol SWP, via the data line C6 will be further possible.

Upon the assignment of the contact pad, three types of lines are applied to the contact pad. On the one hand, they are supply lines, through which electrical supply voltage is applied to the contact pad. In particular C1 and C5 are to be employed as supply voltage lines.

These supply voltage lines preferably are equal for each of the communication protocols to be applied, so that the chip card is always supplied with energy and also upon the change between the protocols no loss of supply voltage occurs. Furthermore, data lines are provided, which are provided for the actual data exchange. These data lines vary on the contact pad in dependence on the protocol to be applied. As a last type, control lines are provided, which control the data exchange, for example a clock signal or a reset signal.

In particular, at least one control line of the third communication protocol is employed in the first communication protocol or second communication protocol additionally to the lines required according to the first communication protocol or second communication protocol. That means, that during the operation in the second protocol there is additionally connected a control line of a first or third protocol to the contact pad, through which the data exchange can be influenced further. In particular by employing a clock signal as a control signal of the third protocol during the operation in the first or second protocol, in which basically no clock signal is provided, a stable clock is present in the chip card, thereby maintaining reliable time management of the commands.

Alternatively, the reset signal as a control signal of the third protocol is employed during the operation in the first or second protocol, in which basically no reset signal is provided, so that a reliable hardware reset can be carried out in the chip card.

The protocol adjustment unit preferably is a subcomponent of the central processing unit CPU incorporated on the semiconductor chip. It can be configured as a hardware unit or is part of the operating system OS of the computing unit.

In a preferred embodiment, each arriving data packet is analyzed, independently of the activated communication protocol, with respect to a communication change.

The protocol adjustment unit has a protocol recognition unit that monitors the signals applied to the respective contact areas of the contact pad and recognizes the protocol change. In doing so, the signals of all the contact areas can be monitored or only those contact areas via which a protocol change can be indicated. If a protocol change was recognized, the protocol adjustment unit ensures that the contact areas required now are activated.

If after the switch-on of the data carrier the protocol control unit recognizes a contact-type ISO communication protocol present at the contact pad, whose protocol's contact assignment comprises the contact areas C2, C3 and C7, an ISO interface unit can be activated as a first contact interface unit and for example the SWP interface unit with the contact C6 as the contactless interface unit. The control unit recognizes the ISO communication protocol for example by a clock signal being present at the contact C3 and a logical voltage level present at the contact C2 being changed from "low" to "high" or 0 to 1 within the framework of a normal initialization sequence of the ISO interface unit. The protocol control unit then activates the contacts C2, C3 and C7 for the ISO communication protocol.

The present invention enables the contactless SWP protocol to be operated via the C6 contact simultaneously with at least one contact-type communication protocol, e.g. with the ISO protocol (via C2, C3, C7). Alternatively, it is possible to operate between the contactless SWP protocol via the C6 contact with either a contact-type high-speed communication protocol, e.g. USB protocol via the fourth combination via C1, C2, C3, C5, C7, or a contact-type protocol, e.g. ISO protocol via the third combination via C1, C2, C3, C5, C7. Besides contactless near field communication via the SWP protocol, other radio communications can also be integrated into the present invention, e.g. communication protocols for RFID ("radio frequency identification"), Bluetooth, WiFi ("wireless fidelity") and the like, which can again use individual contact assignments of the contact pad according to ISO 7816-2.

In a preferred embodiment, the third communication protocol is recognized at the chip card and employed according to a third contact assignment. If now the communication with a high-speed protocol is desired, this is applied on the end device side according to ETSI TS 102 600 version 10.0.0 point 7.2, instead of the contacts C4 and C8 now two of the contacts C2, C3 or C7 being employed. The contact C6 in this embodiment is reserved for the SWP signal.

In a further embodiment the protocol control unit recognizes by a low or zero voltage present at the contact areas C6 and C7, that either no contact-type communication protocol or the contact-type USB high-speed protocol is present. The corresponding USB interface unit within the protocol adjustment unit on the chip card can thus be activated as the first as well as as the second contact interface unit. This makes it possible to exchange data by means of USB protocol at a first time and to exchange data by means of SWP or ISO at a second time. In so doing, it is at no time possible to transmit data simultaneously, i.e. quasi-parallel via USB and ISO or SWP.

The invention is mainly suitable for use in a portable data carrier with a contact pad according to ISO 7816-2 for realizing the contactless SWP protocol besides other common contact-type communication protocols, in particular USB and ISO.

In an embodiment of the invention it is further provided that on the base area of the ISO-7816-2 contact pad for six contact areas there is provided still one single further contact area C9. By this embodiment it is possible to switch over a more flexible change between the contact-type and contactless communication protocols and to carry out a quasi-parallel data exchange between a communication protocol with two data lines and a communication protocol with one single data line, the base area of the contact pad corresponding to the base area of the ISO-7816-2 contact pad having a maximum of six contact areas.

In particular, the seventh contact pad C9 likewise is connected with the protocol recognition unit and thus likewise can be employed for recognizing a protocol change indicated on the end device side.

In a preferred embodiment, the seventh contact area C9 is provided for a data line of the two data lines of the second contact-type communication protocol (for example USB). Additionally, to the contact area C7 there can now be connected the protocol recognition unit, the protocol recognition unit recognizing whether the contact area C7 is to be activated for the second data line of the two data lines of the second contact-type communication protocol or for a data line of the ISO communication protocol. Thus, via the contact area C6 (SWP) and the contact areas C7 and C9 (USB) a quasi-parallel communication between a high-speed protocol and a contactless protocol is possible, the base area of the contact pad corresponding to a contact pad having six contact areas. Alternatively, between ISO (via C7) and SWP (via C6) a quasi-parallel data exchange is made possible hereby.

In an alternative embodiment, the seventh contact area C9 is provided for a data line of the two data lines of the second contact-type communication protocol. Via contact area C7 now the ISO-7816 standard protocol is provided. To the contact area C6 the protocol recognition unit is connected, the protocol recognition unit recognizing whether the contact area C6 is to be activated for the second of the two data lines of the second contact-type communication protocol or for the SWP communication protocol. Thus, via the contact area C7 (ISO) and the contact areas C6 and C9 (USB) a quasi-parallel communication between a high-speed protocol and a contact-type protocol is possible, the base area of the contact pad corresponding to a contact pad having six contact areas. Alternatively, between ISO and SWP a quasi-parallel data exchange is likewise made possible hereby.

Thus, with the employment of a chip card with this method a quasi-parallel contact-type communication according to the ISO protocol (C2, C3, C7), according to the USB protocol (C6, C7, C9) and a contactless communication according to the SWP protocol (C6) is possible.

BRIEF DESCRIPTION OF THE DRAWINGS

Hereinafter the invention, or further embodiments and advantages of the invention, will be explained more closely on the basis of figures, the figures merely describing embodiment examples of the invention. Identical components in the figures are provided with identical reference signs. The figures are not to be considered true to scale, individual elements of the figures may be represented with exaggerated size or exaggerated simplicity.

There are shown:

FIG. 1 An ISO 7816-2 contact pad having 8 contact areas according to the prior art FIG. 2 An ISO 7816-2 contact pad having 6 contact areas according to the prior art FIG. 3 A contact pad having 7 contact areas according to the invention FIG. 4 A chip card with a protocol control unit according to the invention FIG. 5 A contact assignment according to the invention for the exchange of data between chip card and an end device with a 6 contact area contact pad according to FIG. 2

DETAILED DESCRIPTION OF VARIOUS EMBODIMENT

FIG. 1 shows a contact pad 1, known from the prior art, according to the ISO 7816-2 standard with the contact areas C1 to C8 for the exchange of data between a chip card and an end device. Herein, there is applied according to the ISO standard: to the contact area C1 the voltage supply, to the contact area C2 the reset signal, to the contact area C3 the clock signal, to the contact area C5 the ground signal, to the contact area C6 a programming voltage Vpp or a contactless communication protocol, in particular the SWP data signal, to the contact area C7 the data signal. The contacts C4 and C8 are reserved for additional communication protocols, such as e.g. USB or MMC communication. The operation of a chip card with an 8 contact areas contact pad according to FIG. 1 is to be inferred in particular from WO 2008/058743 A1.

With increasing miniaturization there is the need to further reduce the chip cards in size. So as to remain downward-compatible, the minimum of area size for a chip card is a chip card having a contact pad 1 with six contact areas according to the FIG. 2. Here, the contact pad 1 of FIG. 2 corresponds to the contact pad 1 of FIG. 1, the contact areas C4 and C8 being dispensed with. Thereby the contact pad 1 becoming smaller by exactly these two contact areas C4 and C8.

In view of the multiplicity of communication protocols that are nowadays used or desirable, the contact pad 1 having six contact areas according to ISO 7816 does not possess enough individual contacts to permit simultaneous operation of any desired communication protocols.

The problem with such contact pads 1 having only six contact areas is the lacking possibility of the switch-over between high-speed protocols and the (several) common ISO or SWP protocols.

Figure 3:
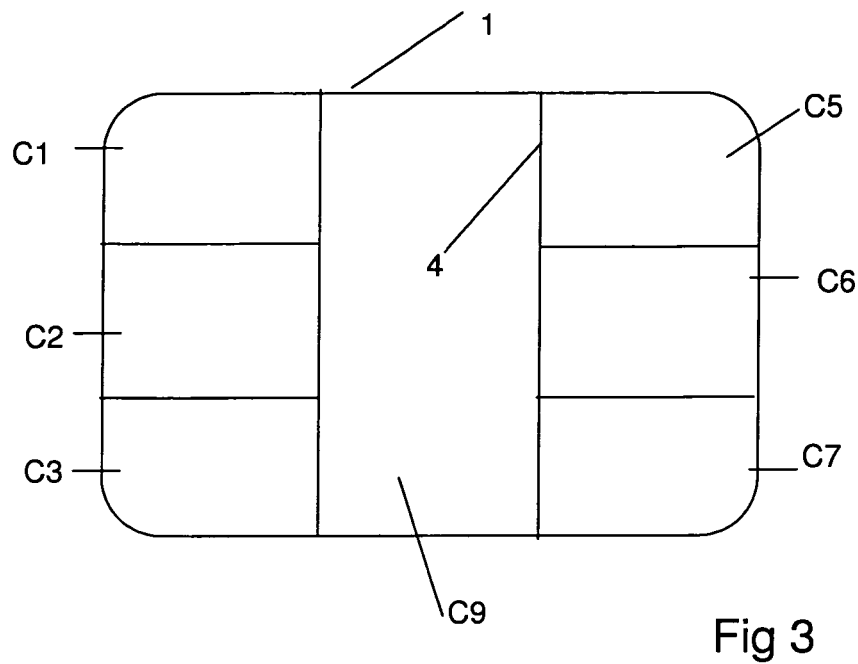

In FIG. 3 there is a contact pad 1, according to the invention, with 7 contact areas C1, C2, C3, C5, C6, C7 and C9. The function and the wiring according to the invention will be explained in the FIGS. 6 to 8. The seventh contact area is preferably separated from the contact area C5 of the ISO 7816-2 standard contact area, for example by a separation of the contact area C5 in the area 4. Inside the contact pad 1 of FIG. 3 there is thus obtained a further contact area C9, a downward compatibility to older contact pad connectors in an end device being further given. Alternatively, the seventh contact area C9 can also be arranged at a different position. It should be expressly pointed out here that the overall size of the contact pad 1 having seven contact areas does not exceed the size according to the ISO 7816-2 standard for a contact pad having six contact areas.

Figure 4:
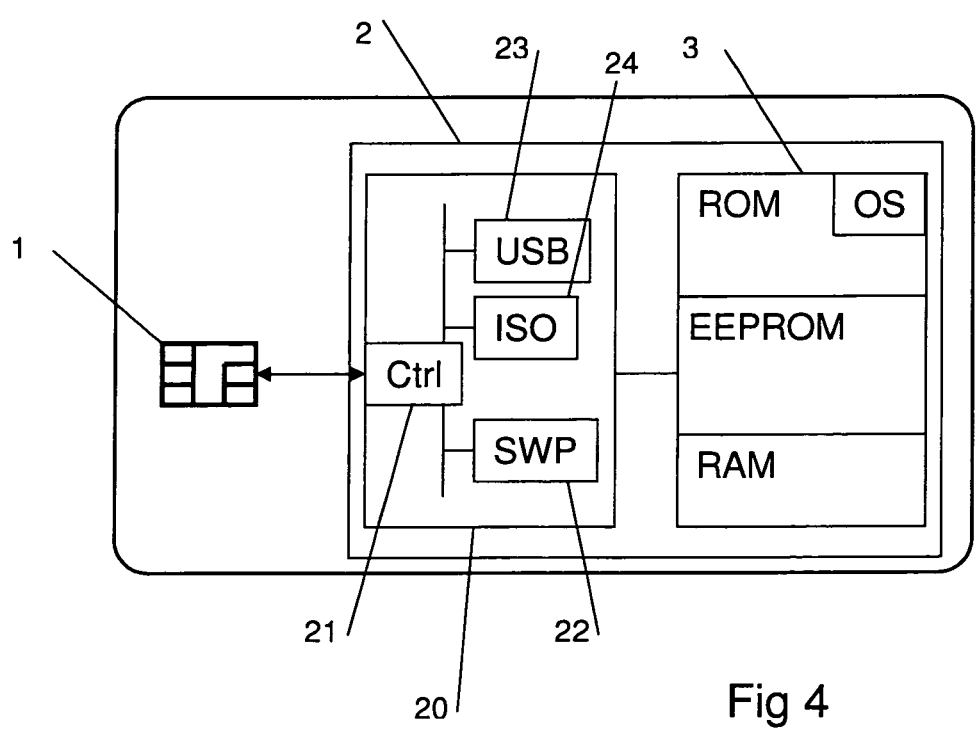

In FIG. 4 there is described a chip card according to the invention with a contact pad having six contact areas. This chip card has a protocol adjustment unit that is provided in particular for making available physical interfaces for different communication protocols via individual contact assignments in chip cards, smart cards, mobile radio cards and the like. Depending on the particular communication protocol ISO, SWP, USB, which specifies in an initialization or start phase of the chip card an end device being in contact with the chip card, for example a mobile phone, bank terminal or other stationary or portable electronic communication apparatus, there are employed certain contact assignments for the particular communication protocols. The communication is then carried out by a corresponding interface unit 22 to 24 via activated contact assignments.

The chip card comprises a central computing unit (CPU) 2 that executes an operating system (OS) in the memory region 3 of the chip card and further applications, e.g. the interface unit 22-24, as well as a memory region 3 consisting of a permanent ROM memory, a non-volatile EEPROM memory and a volatile RAM working memory.

A common communication protocol for communication via a contact pad according to ISO 7816-2 is the contact-type ISO communication protocol made available by an ISO interface unit 24 and whose contact assignment comprises the contacts C1, C2, C3, C5 and C7.

Furthermore, the contact-type high-speed protocols FireWire and USB ("universal serial bus") are increasingly used, whose corresponding interface unit 24 provides according to the invention a communication via the USB protocol via the contacts C1, C5, C6 and C7.

Besides said protocols coordinated with a contact-type communication, it is increasingly common in chip cards to also use communication protocols for a contactless communication, which use further contact assignments of the contact pad according to ISO 7816-2. In this connection there must be mentioned in particular those communication protocols that are used in near field communication of the chip card with an end device via radio or high-frequency signals.

As an example of such contactless communication protocols there will hereinafter be assumed the SWP protocol which uses the contact C6. However, the principle if the invention can be transferred directly to any other contactless communication protocol via which a portable data carrier, such as e.g. a chip card or smart card, can carry out a contactless communication with an end device, terminal or other communication device. It is thus also possible for example to use other contactless communication protocols, e.g. ones coordinated with a radio communication via a Bluetooth interface, via WiFi technology ("wireless fidelity") or via RFID ("radio frequency identification"). These contactless communication protocols can be adjusted with the interface unit 22.

To ensure an as high an availability of the chip card as possible with regard to a contactless near field communication via the SWP protocol and to enable a contactless communication according to the SWP protocol to be executed simultaneously with at least one of the contact-type communication according to one of the contact-type protocols, the chip card comprises a protocol control unit Ctrl 21 which checks a voltage present at individual contacts of the contact pad 1 and ascertains therefrom one or more communication protocols preset by end devices/terminals. In this way the protocol control unit 21 recognizes possible changes of the communication protocol with regard to individual contact areas of the contact pad 1 that are employed by different interface units 22, 23 and 24, and activates the corresponding contact assignments in such a way that besides an active interface unit 23, 24 for contact-type communication at least also one interface unit 22 for contactless communication can be active.

It is thereby achieved in particular that the contact C6 which is required by the SWP interface unit 22 for near field communication is available for the SWP protocol. The protocol control unit 20 enables the chip card to be operated with, besides the SWP interface unit 22, at least one of the USB or ISO interface units 23, 24 shown in FIG. 1 and for it to be preferred by the protocol control unit 20 over a second contact interface unit 23, 24 to be activated.

A collision check and controlled activation by the protocol control unit 20 can be effected within the framework of the boot-up/initialization sequence upon switch-on of the chip card by an adaptive clock recognition at the contacts C3 and C6 being carried out in order to ascertain whether a clock signal is present at one of these contacts C3 and C6. The end device/terminal which is connected to the chip card ensures that in this phase only one of two contacts C3 and C6 carries a clock signal and the other has a constant voltage level.

A present ISO communication protocol is recognized by the protocol recognition unit 21 in the protocol control unit 20 by a clock signal present at the contact C3 and a change of the voltage level at the contact C2 from 0 (low) to 1 (elevated) within the framework of the initialization sequence of the ISO protocol. The protocol control unit 20 then activates the ISO interface unit 24 with the contact C3 for the clock (CLK), C2 for a reset line (RST) and C7 for an input/output data line (I/O).

Figure 5:
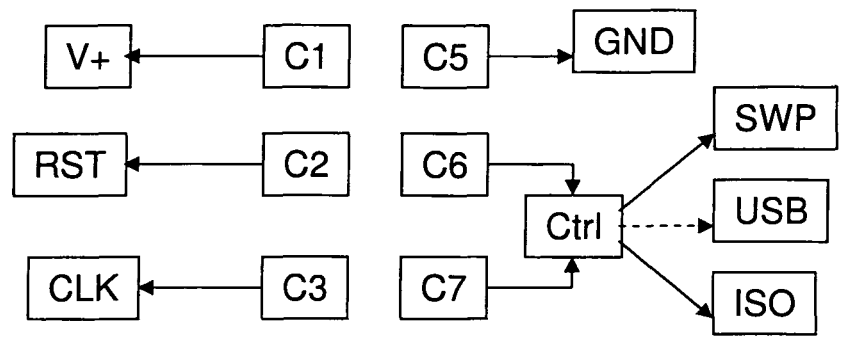

In FIG. 5 there is represented an exemplary wiring of the contact pad 1 with the contact areas C1, C2, C3, C5, C6 and C7 for the method according to the invention. Here, the contact areas C6 and C7 are connected with the protocol recognition unit 21. The protocol recognition unit 21 switches in dependence on the signals present at the contact pad 1 either the interface unit 22, 23 or 24 and accordingly the contact area assignment according to the communication protocols USB, ISO or SWP to the contact pad 1. Regarding this, in FIG. 5 there is shown the operation of the ISO interface unit 24, USB interface unit 23 as well as SWP interface unit 22. The USB protocol carries during its initialization sequence a zero voltage at C6 and C7, by which the USB protocol can be distinguished from the SWP and the ISO protocol. By the zero voltage at C6 and/or C7 or by special USB initialization signals at C6 (D+) or C7 (D−) within the framework of the USB initialization sequence, a USB protocol present at the contact pad 1 is recognized by the protocol recognition unit 21 and thus the USB interface unit 23 activated. Since the contact assignment of the USB interface device 23 collides with the ISO and SWP interface units 22 and 24, a switch-over to the ISO or SWP protocols is only possible via determined data packets or the wiring of the contact area C3 Reset or C2 CLK. Some examples of a protocol switch-over:

Since in the USB operation the contacts C1, C5, C6 and C7 are assigned, a protocol change could be indicated via a signal level change at C2 or C3. If the chip card recognizes an indicated change, it can thus switch over the operation from USB protocol to a SWP and ISO protocol operation.

The protocol adjustment unit 20 applies the interface units necessary therefor. The contact area C6 is then provided for the input of the SWP data, C7 for the input/output of data from the ISO protocol. C1 and C5 further serve for supply voltage, C2 becomes reset and the supply cycle CLK is applied to C3.

Alternatively, a signal burst, for example a sequence of fast flank changes of the signals at the C6 and C7 contacts, can indicate the change to the protocol recognition unit.

Alternatively, a determined or predefined USB data packet is employed, for example a sequence of particular data words, which indicate to the chip card that a switch-over is to be made from the USB high-speed mode to the ISO/SWP mode. In particular, the switch-over is made between an SWP and the USB mode.

Alternatively, with the data lines and/or supply voltage lines there is employed a voltage range which according to the respective protocol represents a violation of the level and by which the end device indicates to the protocol adjustment unit 20 the change into a different protocol.

An SWP protocol present at the contact pad 1 is fundamentally recognizable by a voltage modulation at the contact C6, because in contrast to the data signals of contact-type protocols otherwise present at the contact C6, such as the data signal D+ or D− of the USB protocol, the SWP signal is pulse-width modulated and thus distinguishable from a USB data signal D+ or D−. In this way, the protocol control unit 20 can perform an exclusive activation of the SWP interface unit 22. The semiconductor chip can here be further supplied with voltage with C1 and C5. Alternatively, the supply required for the evaluation of the SWP data can also be effected via an NFC power supply of the chip card, if this has a near field communication controller.

Figure 6:
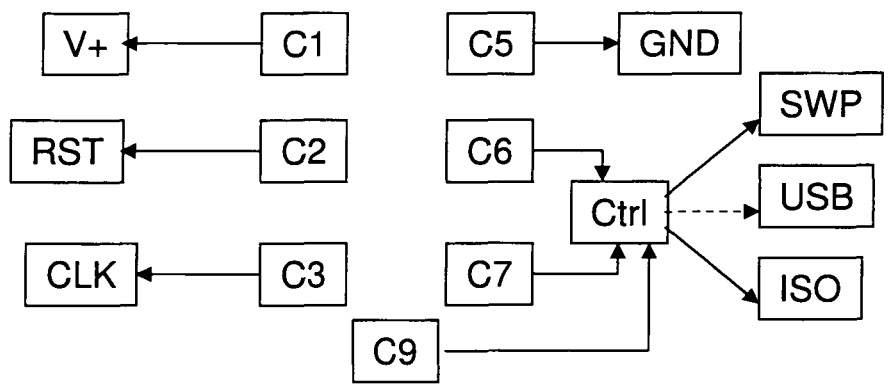
FIG. 6 A contact assignment according to the invention for the exchange of data between chip card and an end device with a 7 contact area contact pad according to FIG. 3

In FIG. 6 there is represented a wiring example of a chip card. FIG. 6 corresponds in wide sections to the wiring example of FIG. 5, so that in the following only the differences between FIG. 5 and FIG. 6 are pointed out. In FIG. 6 there is shown the wiring of a contact pad 1 represented in FIG. 3 with seven contact areas. This seventh contact area C9 likewise is connected with the protocol recognition unit 21.

The USB, SWP and the ISO interface units 23, 22, 24 can now be activated simultaneously, because via these three data inputs C6, C7 and C9 the interface units 22, 23, 24 USB can be applied to two data lines and an additional interface unit ISO or USB to the chip card.

By the quasi-parallel operation of a high-speed protocol (USB or FireWire) and a further protocol (either ISO or SWP), as represented in FIG. 6, a very flexible data exchange between chip card and end device is enabled despite the miniaturization of the chip card to the ISO-7816-2 contact pad size for six contact areas.

In particular, a quasi-parallel operation between USB and SWP is to be sought, because via a contactless interface unit the data are often subjected to time-critical boundary conditions. For a transaction by means of SWP few 100 ms are available.

Figure 7:
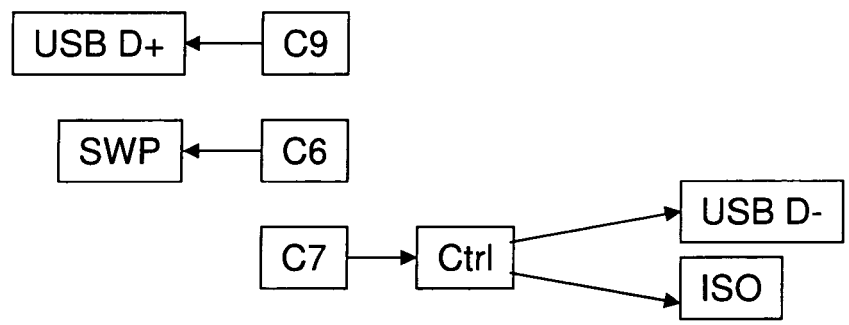
FIG. 7 A contact assignment according to the invention for the quasi-parallel exchange of data via a high-speed communication protocol and a contactless communication protocol FIG. 8 A contact assignment according to the invention for the quasi-parallel exchange of data via a high-speed communication protocol and a contact-type communication protocol FIG. 9 A contact assignment according to the invention, alternative to FIG. 5, for the exchange of data between chip card and an end device with a 6 contact area contact pad according to FIG. 2

In the FIG. 7 there is shown a further wiring example of the invention for wiring a contact pad 1 having seven contact areas. Here, in contrast to FIG. 6, the contactless protocol SWP at C6 is no longer monitored via the protocol recognition unit 21, but an SWP data signal of the end device is directly switched to the chip card at the contact C6. The contact C9 likewise is not switched via the protocol recognition unit 21, but is reserved directly for a data line D+ (or D−) of the high-speed protocol USB. Only to contact area C7 the protocol recognition unit 21 is connected, via this unit 21 either being switched the second data line D− (or D+) of the high-speed protocol or the data line of the ISO 7816 protocol via the interface units 23 and 24 to the contact area C7.

By this wiring of the FIG. 7 the contactless communication protocol, in particular SWP, is available as standard for the chip card, in order to exchange data. Via the contact area C7 the end device additionally indicates to the chip card, whether a data exchange is effected via a high-speed protocol, in particular USB or FireWire, via the contacts C7 and C9 or whether the ISO standard protocol is applied to the contact pad C7. The other contacts C2, C3 are interconnected according to ISO standard.

Figure 8:
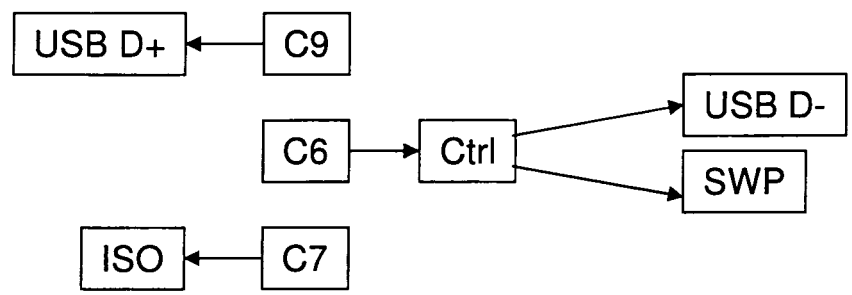

In the FIG. 8 there is shown a further wiring example of the invention for wiring a contact pad 1 having seven contact areas. Here, in contrast to FIG. 7, the contact-type protocol ISO at C7 is no longer monitored via the protocol recognition unit 21, but an ISO data signal of the end device is directly switched to the chip card at the contact C7. The contact C9 likewise is not switched via the protocol recognition unit 21, but is reserved directly for a data line D+ (or D−) of the high-speed protocol USB. Only to contact area C6 the protocol recognition unit 21 is connected, via this unit 21 either being switched the second data line D− (or D+) of the high-speed protocol or the data line of the SWP contactless protocol via the interface units 22 and 23 to the contact area C6.

By this wiring of the FIG. 8 a contact-type communication protocol, in particular ISO, is available as standard for the chip card, in order to exchange data. Via the contact area C6 the end device additionally indicates to the chip card, whether a data exchange is effected via a high-speed protocol, in particular USB or FireWire, via the contacts C6 and C9 or whether the SWP protocol is applied to the contact pad C6. The other contacts C2, C3 are interconnected according to ISO standard.

The voltage supply at the contacts C1 and C5 is applied, according to ISO or according to USB standard, either permanently or is employed by the end device to indicate protocol changes, in particular by voltage modulations or violations of the voltage level.

Figure 9:
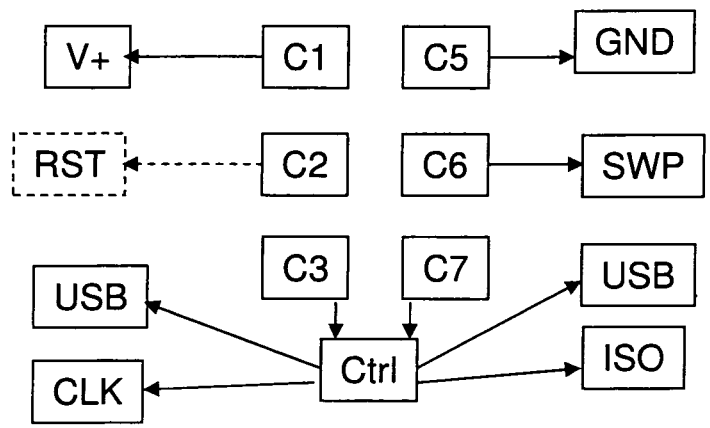

In FIG. 9 there is represented an alternative of the invention. Here, the contact areas C2, C3, C7 are employed for the switch-over between ISO and USB, whereas C6 is always available as an I/O for the SWP protocol.

First, for an operation according to FIGS. 9 and 10 the ISO protocol is applied according to ISO 7816-3 and subsequently a switch-over to the USB protocol as the second communication protocol is made. The switch-over from ISO to USB can be effected similar to ETSI TS 102 600 version 10.0.0 point 7.2. In contrast to ETSI TS 102 600 the contacts C4 and C8 are not provided for the six contact areas contact pad 1. It is preset that the contact C6 is not to be employed for the operation of the chip card according to SWP protocol.

To carry out the switch-over from ISO to USB on the chip card, first, according to the third combination, the ISO protocol will be applied to the contact pads C1, C2, C3, C5, C7 by the end device. The end device receives an answer to reset ATR answer according to the ETSI TS 102 221 from the chip card. In the ATR there will be described that the UICC of the chip card can exchange data by means of USB protocol. If the end device wants to continue the communication via USB, it now sends a protocol parameter selection, PPS for short, command. In particular, no 'C0' is sent, because this is reserved for the USB data exchange via C4 and C8. For example, for the switch-over to USB according to the invention the command 'D0' or 'E0' is provided, so that first there can be freely selected between the switch-over to C4, C8 or the switch-over according to the invention at two of the contacts or C7 as the two USB data lines D+ and D– and is represented by two alternatives according to FIG. 9 and FIG. 10.

The employment of C7 as one of the two data lines D+ or D– is in particular advantageous, because this data line is available to C7 and cannot be employed for any other purposes in the USB mode. In FIGS. 9 and 10, C7 is thus connected to the protocol adjustment unit CTRL and to be employed either as a USB data line connector D+/D– or as an ISO I/O.

Figure 10:
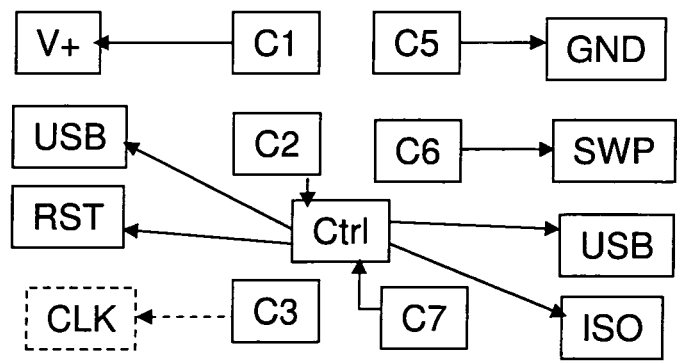
FIG. 10 A contact assignment according to the invention, alternative to FIG. 9, for the exchange of data between chip card and an end device with a 6 contact area contact pad according to FIG. 2

According to FIGS. 9 and 10, embodiments are represented, in which, besides the required lines for applying the USB protocol, also a control line of the ISO protocol is employed. Since these control lines do not belong to the USB protocol and serve as an optional wiring, the corresponding contact assignments are represented in dotted lines.

If according to FIG. 9 the C3 contact is employed as the second data line D+ or D– for the USB protocol, the contact C2 is thus of no use in the USB mode. If contact C2 is further employed as a reset control signal according to the ISO protocol in the USB or SWP mode, a very reliable hardware reset can be carried out, as soon as a level change is recognized at the contact C2. By the hardware reset there can be avoided errors in the protocol changeover or in general a faulty chip card function.

If according to FIG. 10, alternatively, the C2 is employed as the second data line D+ or D– for the USB protocol, the contact C3 is thus of no use in the USB mode. If the contact C3 is further used as the clock control signal according to the ISO protocol in the USB or SWP mode, to the chip card there can be made available a very stable clock, so that an exact time management regarding the commands is to be expected. This is of advantage in particular with time-critical commands or with wait states.

LIST OF REFERENCE NUMBERS

1 Contact pad
  C1 Contact area Vcc
  C2 Contact area reset
  C3 Contact area clock
  C4 Contact area reserved
  C5 Contact area ground
  C6 Contact area Vpp or SWP
  C7 Contact area I/O
  C8 Contact area reserved
  C9 Contact area new
2 CPU
  20 Protocol adjustment unit
  21 Protocol recognition unit Ctrl
  22 SWP protocol unit
  23 USB protocol unit
  24 ISO protocol unit
3 Memory region
4 Region of separation of contact area C5

The invention claimed is:

1. A method for exchanging data between an end device and a chip card, wherein the data exchange between end device and chip card is effected in contact-type fashion via a contact pad having a maximum of six contact areas according to the ISO-7816-2 standard, having the method steps:

activating a first contact assignment in reaction to a first communication protocol present at the contact pad and assigned to a first combination of the at most six contact areas of the contact pad;

recognizing a change of the communication protocol from the first communication protocol to a second communication protocol by a protocol recognition unit within the chip card; and activating a second contact assignment in reaction to the recognized second communication protocol and assigned to a second combination of the six contact areas of the contact pad;

wherein the first communication protocol is in particular a contactless communication protocol different from the ISO-7816 standard, and the second communication protocol is a communication protocol with two data lines.

2. The method according to claim 1, wherein the chip card is a subscriber identification card and the external end device a mobile communication end device for the operation in a mobile communication network.

3. The method according to claim 1, wherein the second communication protocol is a high-speed communication protocol, in particular USB or FireWire.

4. The method according to claim 1, wherein the first communication protocol is the Single Wire, the Bluetooth, the WiFi or an RFID protocol.

5. The method according to claim 1, wherein the chip card recognizes the protocol changes by:

monitoring a signal level on a contact area of the six contact area contact pad, which is not employed for the respectively activated communication protocol and/or evaluating a determined data packet within the respectively activated first or second communication protocol.

6. The method according to claim 5, wherein the determined data packet is a signal burst predefined for the communication protocol to be activated or a signal level alteration representing a violation of the activated communication protocol.

7. The method according to claim 1, wherein the chip card recognizes the protocol change by monitoring the voltage supply, in particular by evaluating a voltage modulation.

8. The method according to claim 1, wherein the contact pad has an additional seventh contact area (C9), which is reserved for a data line of the second communication protocol, wherein the second data line of the second communication protocol is activated via the contact areas C6 or C7 of the contact pad.

9. A method for exchanging data between an end device and a chip card, wherein the data exchange between end device and chip card is effected in contact-type fashion via a contact pad having a maximum of six contact areas according to the ISO-7816-2 standard, having the method steps:

activating a third contact assignment in reaction to a third communication protocol present at the contact pad, wherein the third communication protocol is a communication protocol according to the ISO-7816 standard and is assigned to a third combination (C1, C2, C3, C5, C7) of the at most six contact areas of the contact pad;

recognizing a change of the communication protocol from the third communication protocol to a second communication protocol (USB) or a first communication protocol by a protocol recognition unit within the chip card; and activating a second contact assignment in reaction to the recognized second communication protocol, wherein the second communication protocol (USB) is assigned to a fourth combination (C1, C2, C3, C5, C7) of the six contact areas of the contact pad;

wherein the second communication protocol is a communication protocol with two data lines, and the first communication protocol is in particular a contactless communication protocol different from the ISO-7816 standard and a data line (C6) of the first communication protocol is neither employed in the third combination (C1, C2, C3, C5, C7) nor in the fourth combination (C1, C2, C3, C5, C7) of the six contact areas of the contact pad.

10. The method according to claim 9, wherein at least one control line (C2 or C3) of the third communication protocol is employed in the first communication protocol or second communication protocol in addition to the lines required according to first communication protocol or second communication protocol.

11. A chip card comprising:
a contact pad according to the ISO 7816-2 standard having at most six contact areas,
at least two interface units for data exchange with an end device according to a corresponding communication protocol via a corresponding contact assignment of the contact pad and
a protocol adjustment unit, wherein the at least two interface units comprise:
at least one contact interface unit for communication according to a first contact-type communication protocol or a second contact-type communication protocol; and
a contactless interface unit for communication according to a contactless communication protocol via a preset contact assignment of the contact pad;
wherein the protocol adjustment unit has a protocol recognition unit, wherein the protocol recognition unit is adapted to activate, simultaneously with a first interface unit already activated in reaction to a communication protocol present at the contact pad, a second interface unit in reaction to a second communication protocol present at the contact pad;
wherein the contact pad is an ISO-7816-2 contact pad having a maximum of six contact areas and the second contact-type communication protocol comprises at least two data lines.

12. The chip card according to claim 11, wherein the protocol recognition unit is connected with the contact areas C6 and C7 of the contact pad and by predefined data packets the data exchange is adjustable by means of the interface units.

13. The chip card according to claim 11, wherein a sevenths contact pad C9 is provided for the data exchange and the seventh contact area of the contact pad likewise is connected with the protocol recognition unit.

14. The chip card according to claim 11, wherein:
a seventh contact area C9 of the contact pad is provided for a data line of the two data lines of the second contact-type communication protocol;
via the contact area C6 of the contact pad the data exchange by means of SWP protocol is provided and to the contact area C7 of the contact pad the protocol recognition unit is connected, wherein the protocol recognition unit recognizes, whether the contact area C7 is to be activated for the second data line of the two data lines of the second contact-type communication protocol or for a data line of the ISO-7816 communication protocol.

15. The chip card according to claim 11, wherein:
a seventh contact area C9 of the contact pad is provided for a data line of the two data lines of the second contact-type communication protocol;
via the contact area C7 of the contact pad the ISO-7816 standard protocol is provided and to the contact area C6 of the contact pad the protocol recognition unit is connected, wherein the protocol recognition unit recognizes, whether the contact area C6 of the contact pad is to be activated for the second data line of the two data lines of the second contact-type communication protocol or for the SWP communication protocol.

* * * * *